(12) United States Patent
Kanai et al.

(10) Patent No.: US 7,607,284 B2
(45) Date of Patent: Oct. 27, 2009

(54) RIDING-TYPE MOWER VEHICLE

(75) Inventors: Toshiki Kanai, Sakai (JP); Hiroyuki Ogasawara, Nishinomiya (JP); Nobuyuki Yamashita, Izumi (JP); Kazuaki Kurohara, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 12/032,813

(22) Filed: Feb. 18, 2008

(65) Prior Publication Data

US 2008/0202089 A1 Aug. 28, 2008

(30) Foreign Application Priority Data

Feb. 26, 2007 (JP) .............................. 2007-045681

(51) Int. Cl.
*A01D 43/00* (2006.01)
(52) U.S. Cl. ...................................................... 56/202
(58) Field of Classification Search ........... 56/202–206, 56/194, 199, 320.1, 320.2, 16.6
See application file for complete search history.

(56) References Cited

U.S. PATENT DOCUMENTS

| 4,532,756 | A | * | 8/1985 | Merkel | ........................ | 56/202 |
| 4,589,251 | A | | 5/1986 | Amano et al. | | |
| 5,195,310 | A | * | 3/1993 | Kettler et al. | ................. | 56/202 |
| 7,322,176 | B2 | * | 1/2008 | Benway | ....................... | 56/202 |

FOREIGN PATENT DOCUMENTS

JP          2002036896          2/2002

* cited by examiner

*Primary Examiner*—Robert E Pezzuto
(74) *Attorney, Agent, or Firm*—The Webb Law Firm

(57) ABSTRACT

A riding-type mower vehicle comprises a mower supported by a vehicle body; a grass collector configured to receive cut grass cut by the mower; a vehicle-side connector located at a rear position of the vehicle body and having a pair of inclined guide portions that face each other such that a distance between the inclined guide portions decreases toward lower portions of the inclined guide portions to open upwardly; and a collector-side connector provided to the grass collector to extend generally downwardly and having a pair of inclined guided portions whose distance from each other decreases toward lower portions of the inclined guided portions; wherein the collector-side connector is attached to the vehicle-side connector by inserting an inclined guided portion of the collector-side connector between the pair of inclined guide portions of the vehicle-side connector.

9 Claims, 11 Drawing Sheets

RIDING-TYPE MOWER VEHICLE

BACKGROUND OF THE INVENTION

1. Field of the Invention

The present invention relates to a structure for attachment and detachment of a grass collector in a riding-type mower vehicle that is provided with a mower in a portion in front of the front wheels or a portion between the front wheels and the rear wheels in a vehicle body, and is also provided with a grass collector in the rear part of the vehicle body, wherein the cut grass that is cut by the mower is fed to the grass collector.

2. Description of the Related Art

As disclosed in JP2002-36896, for example, a riding-type mower vehicle is known in which a frame connects to the front part of a grass collector and extends forward, and the frame of the grass collector is connected by bolts to a bracket connected to the rear part of the vehicle body.

Since the bolts must be tightened or loosened when the grass collector is attached or detached according to the above-mentioned reference, time is required to attach or detach the grass collector.

Therefore, in the device disclosed in U.S. Pat. No. 4,589,251, a boss part is connected to the rear part of the vehicle body, the frame of the grass collector is inserted in the boss part of the vehicle body, and a pin for preventing detachment is attached in an attachment hole of the boss part of the vehicle body. The frame of the grass collector can thereby be easily removed from the boss part of the vehicle body by attaching or removing the pin, and the crass collector can be removed.

In U.S. Pat. No. 4,589,251, when the inner diameter of the boss part of the vehicle body and the outer diameter of the grass collector frame are not set with good precision, the grass collector frame sometimes rattles against the boss part of the vehicle body, and the grass collector rattles due to vibration during travel, thus imparting discomfort to the operator.

SUMMARY OF THE INVENTION

An object of the present invention is to provide a configuration in a riding-type mower vehicle whereby the grass collector can be attached to the rear part of the vehicle body without rattling, while making the grass collector easy to attach and detach when the grass collector is configured so as to be detachable.

The riding-type mower vehicle of the present invention comprises a vehicle body supported by a plurality of wheels; a mower supported by the vehicle body; a grass collector attached to a rear part of the vehicle body and configured to receive cut grass cut by the mower; a vehicle-side connector located at a rear position of the vehicle body and having a pair of inclined guide portions that face each other such that a distance between the inclined guide portions decreases toward lower portions of the inclined guide portions to open upwardly; and a collector-side connector provided to the grass collector to extend generally downwardly and having a pair of inclined guided portions whose distance from each other decreases toward lower portions of the inclined guided portions; wherein the collector-side connector is attached to the vehicle-side connector by inserting an inclined guided portion of the collector-side connector between the pair of inclined guide portions of the vehicle-side connector.

Accordingly, when the grass collector is attached to the rear portion of the vehicle body, the inclined guided portions of the collector-side connector are inserted between the inclined guide portions of the vehicle-side connector from above, while the grass collector is moved downward.

According to this configuration, the inclined guided portions of the collector-side connector can easily be inserted between the inclined guide portions of the vehicle-side connector from above, and the guiding function of the inclined guide portions of the vehicle-side connector allows the inclined guided portions of the collector-side connector to be guided to the inside (downward) between the inclined guide portions of the vehicle-side connector, and the grass collector (collector-side connector) to be easily attached to the rear portion (vehicle-side connector) of the vehicle body.

After the grass collector is attached to the rear portion of the vehicle body, the grass collector (collector-side connector) is supported with minimal rattling by the rear portion (vehicle-side connector) of the vehicle body by the weight of the grass collector and the weight of the cut grass accumulated in the grass collector.

The riding-type mower vehicle according to an embodiment of the present invention preferably comprises a disengagement prevention member for preventing the collector-side connector from disengaging from the vehicle-side connector.

The riding-type mower vehicle according to an embodiment of the present invention is preferably configured such that each of the pair of inclined guide portions has a linear portion having a length that is 50% or greater of a vertical length of the vehicle-side connector.

The riding-type mower vehicle according to an embodiment of the present invention is preferably configured such that each of the pair of inclined guide portions has a linear portion having a length that is 80% or greater of a vertical length of the vehicle-side connector.

The riding-type mower vehicle according to an embodiment of the present invention is preferably configured such that substantially the entire linear portion comes in contact with a corresponding portion of the pair of inclined guided portions when the collector-side connector is attached to the vehicle-side connector.

The riding-type mower vehicle according to an embodiment of the present invention is preferably configured such that the vehicle-side connector supports substantially the entire weight of the collector when the collector-side connector is attached to the vehicle-side connector.

In an embodiment of the present invention, the configuration described below can also be adopted to obtain the same effects. The riding-type mower vehicle comprises a vehicle body supported by a plurality of wheels; a mower supported by the vehicle body; a vehicle-side connector located at a rear position of the vehicle body to extend generally upwardly and having a pair of inclined guide portions whose distance therebetween decreases toward upper portions of the inclined guide portions; and a collector-side connector attached to a grass collector and having a pair of inclined guided portions that face each other such that a distance from each other decreases toward upper portions of the inclined guided portions to open generally downwardly; wherein the collector-side connector is attached to the vehicle-side connector by causing the inclined guide portions of the vehicle-side connector to be inserted between the pair of inclined guided portions of the collector-side connector.

The riding-type mower vehicle according to an embodiment of the present invention preferably further comprises a disengagement prevention member for preventing the collector-side connector from disengaging from the vehicle-side connector.

The riding-type mower vehicle according to an embodiment of the present invention is preferably configured such that each of the pair of inclined guided portions has a linear portion having a length that is 50% or greater of a vertical length of the vehicle-side connector.

The riding-type mower vehicle according to an embodiment of the present invention is preferably configured such that each of the pair of inclined guided portions has a linear portion having a length that is 80% or greater of a vertical length of the collector-side connector.

The riding-type mower vehicle according to an embodiment of the present invention is preferably configured such that substantially the entirety of the linear portion comes in contact with a corresponding portion of the pair of inclined guide portions when the collector-side connector is attached to the vehicle-side connector.

The riding-type mower vehicle according to an embodiment of the present invention is preferably configured such that the vehicle-side connector supports substantially the entire weight of the collector when the collector-side connector is attached to the vehicle-side connector.

DESCRIPTION OF THE PREFERRED EMBODIMENTS

Embodiments of the present invention will next be described. Combinations of one feature of an embodiment with features of another embodiment are also understood to fall within the scope of the present invention.

Figure 1:
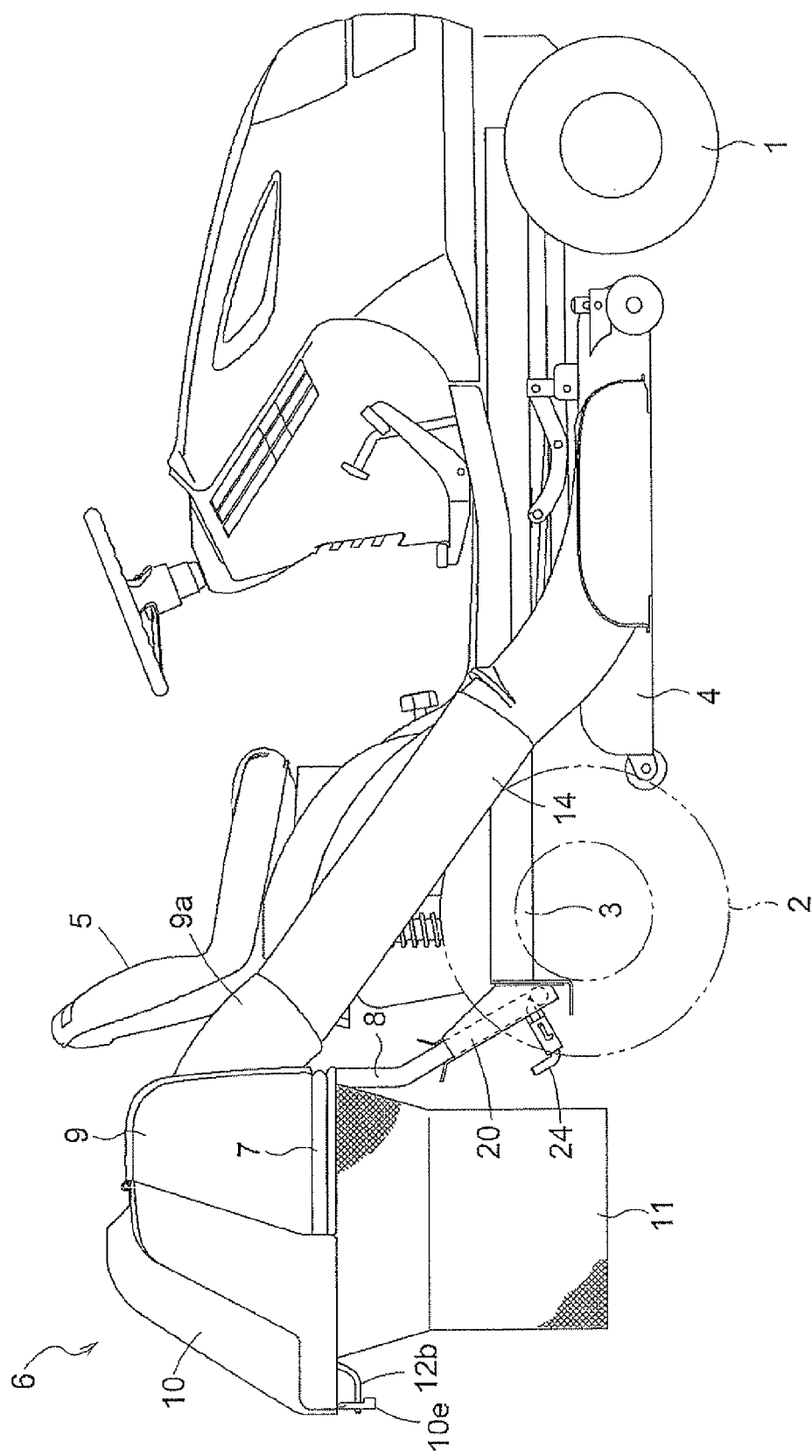
FIG. 1 is a side view showing the entire riding-type mower vehicle.
Figure 2:
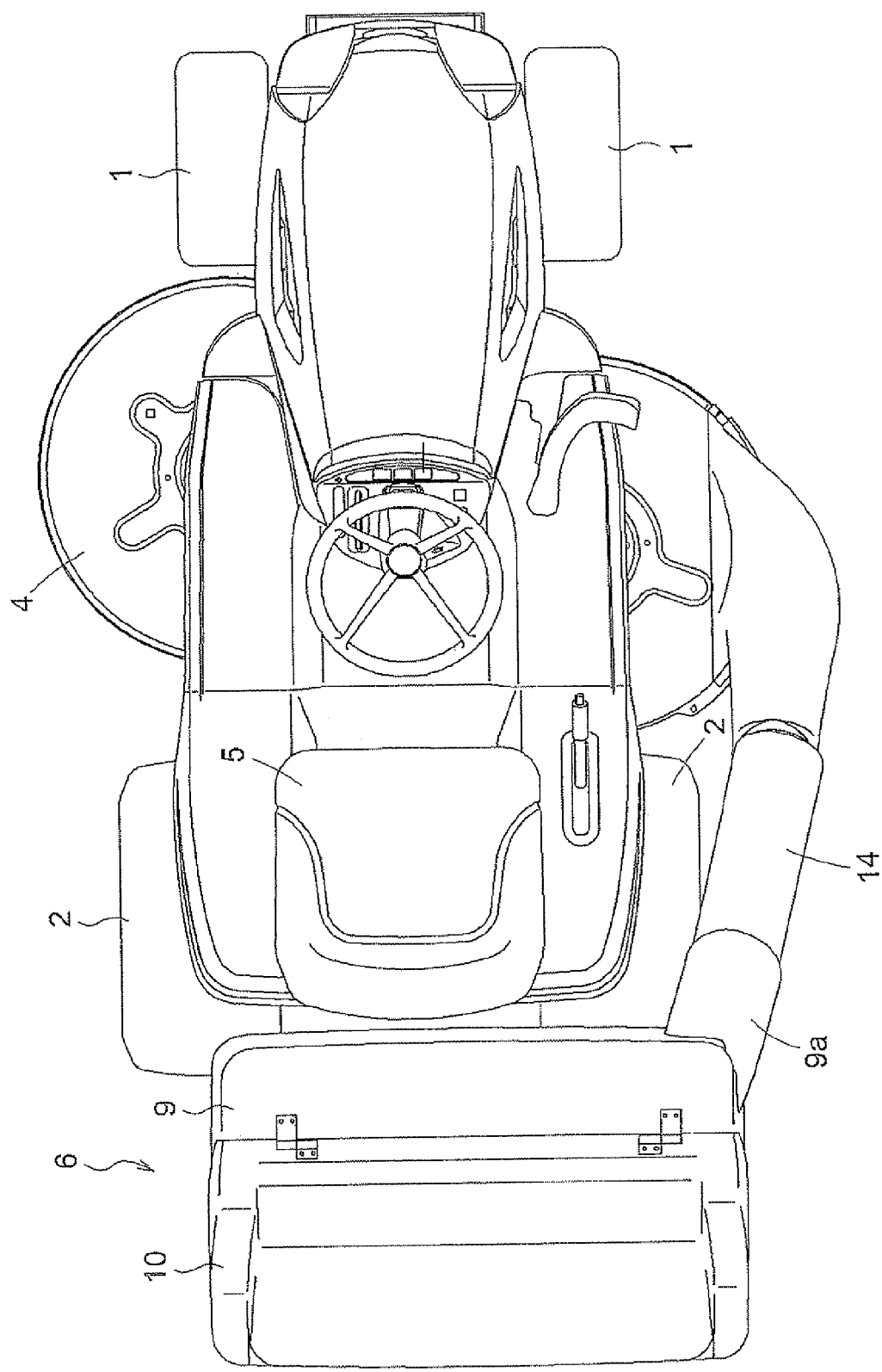
FIG. 2 is a plan view showing the entire riding-type mower vehicle.

As shown in FIGS. 1 and 2, the riding-type mower vehicle has a configuration in which a mower 4 is supported at the bottom of the center of a vehicle body frame 3 that is supported by right and left front wheels 1 and right and left rear wheels 2, an operation chair 5 is provided at the top of the rear portion of the vehicle body frame 3, and a grass collector 6 is supported by the rear portion of the vehicle body. The grass collector 6 is provided with a support frame 7, a connecting frame 8 (which corresponds to the collector-side connector), a front cover 9, a rear cover 10, and two grass collecting bags 11 or the like.

The support frame 7 in the grass collector 6 will next be described.

Figure 4:
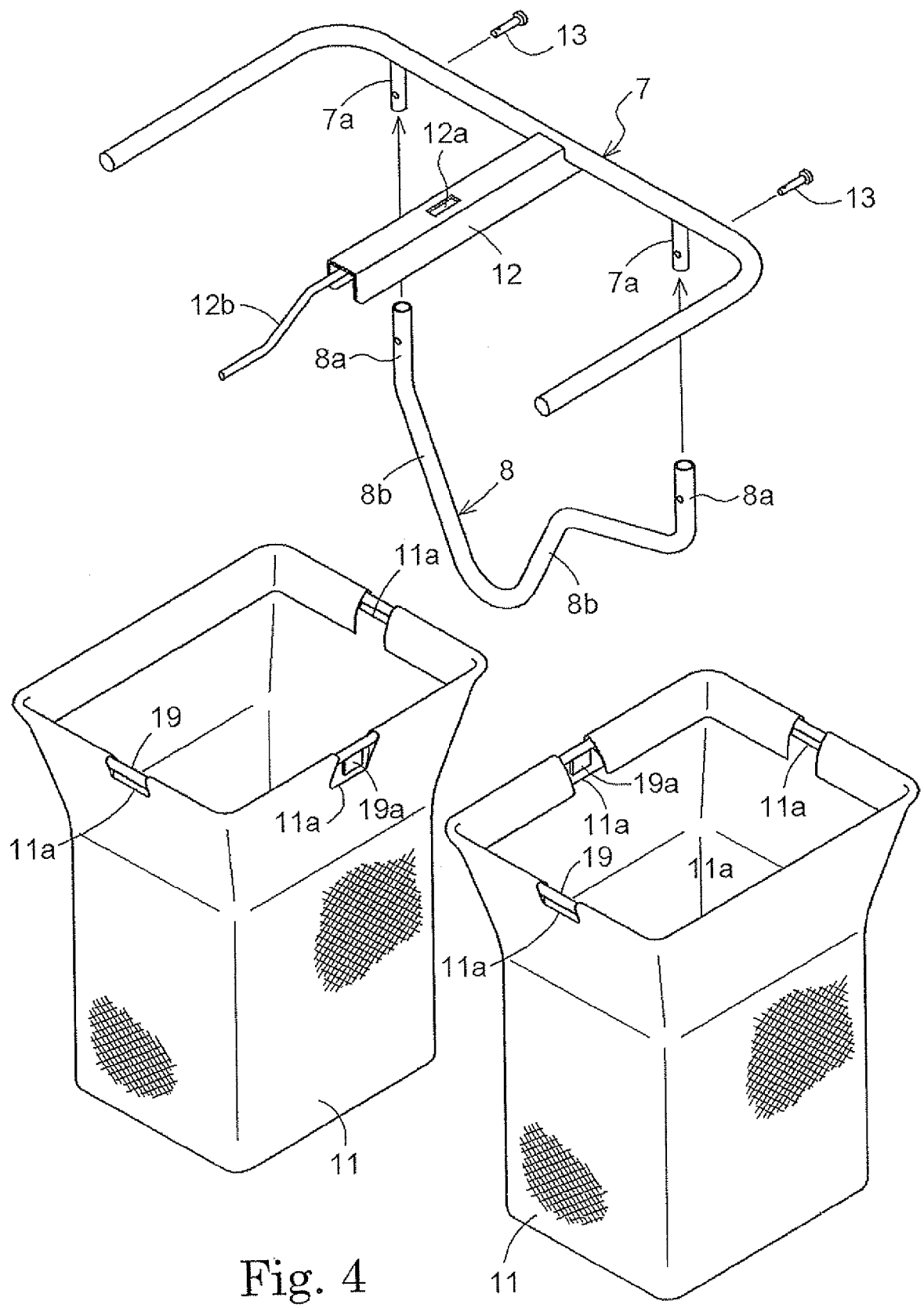
FIG. 4 is an exploded perspective view showing the support frame, the connecting frame, and the grass collection bag in the grass collector.

As shown in FIG. 4, the support frame 7 is formed by a single round metal pipe that is bent into a bracket shape as viewed from above, a support frame 12 formed by bending a metal sheet into a bracket shape is fixed to the center part of the support frame 7, and connectors 7a formed by short round pipes are fixed at the right and left sides of the support frame 7. An open portion 12a is provided in the center of the support frame 12, and a round rod locking part 12b is fixed to the end of the support frame 12.

The connecting frame 8 in the grass collector 6 will next be described.

Figure 5:
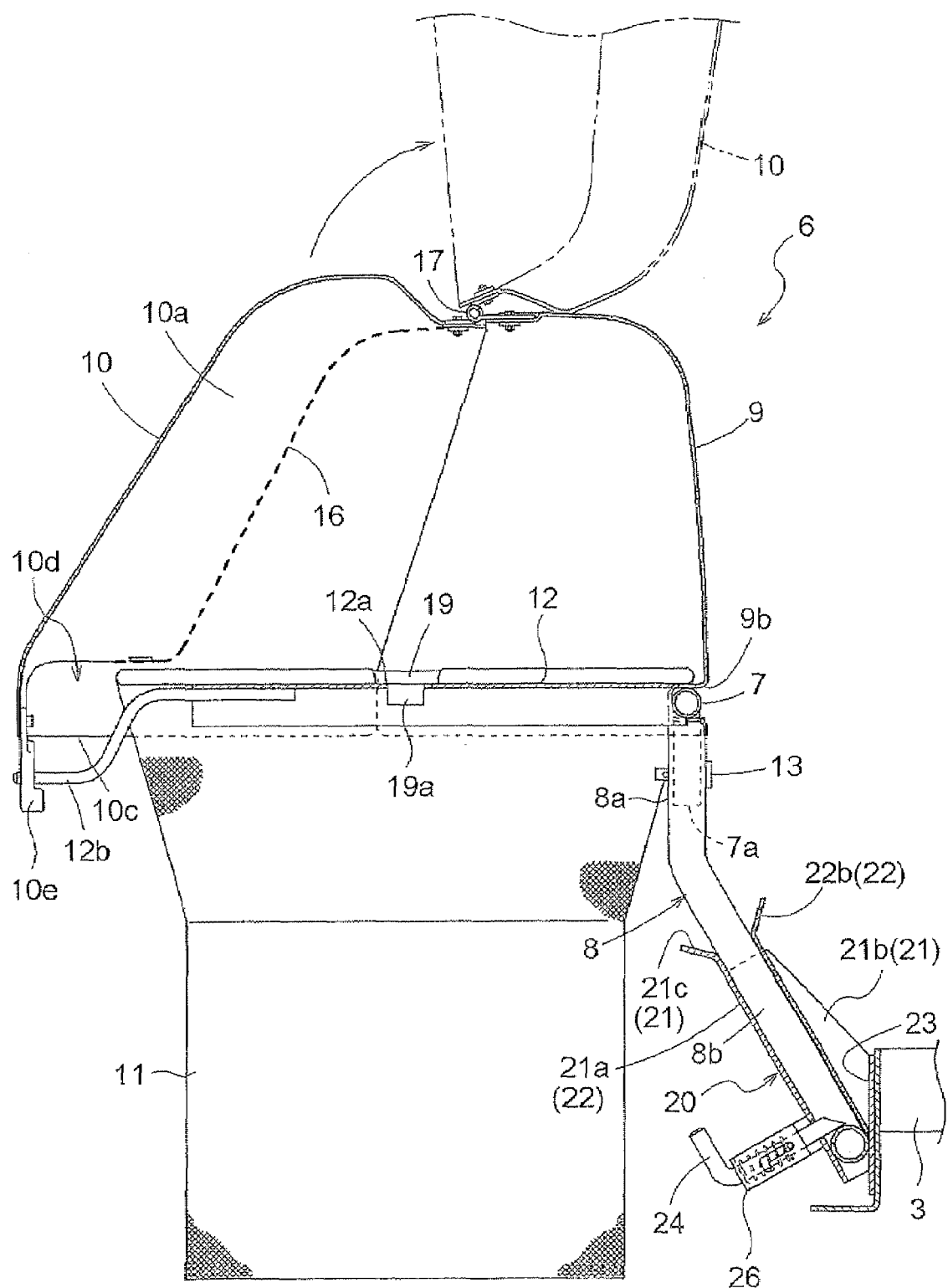
FIG. 5 is a longitudinal sectional side view showing the grass collector and the vicinity of the vehicle-side connector.
Figure 6:
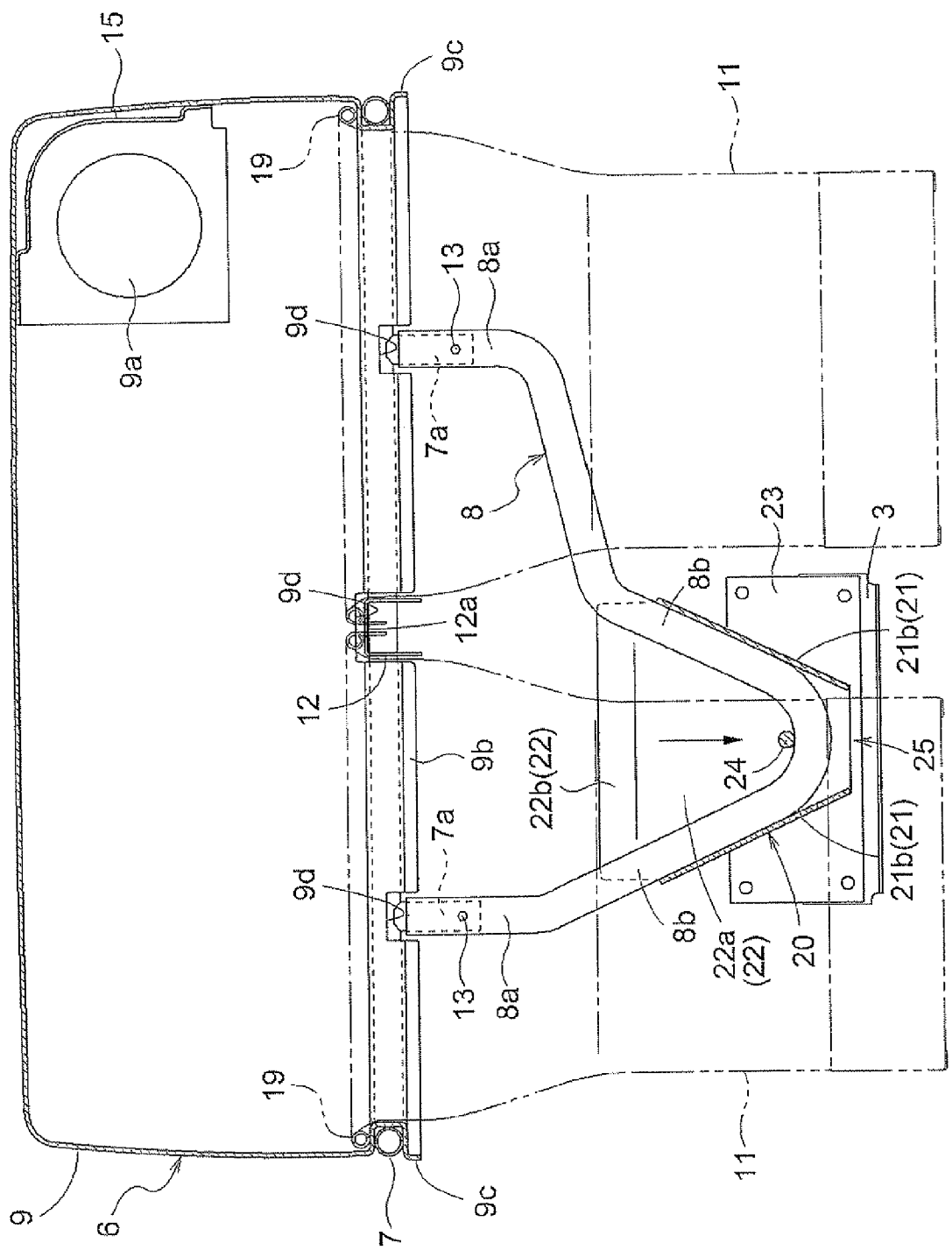
FIG. 6 is a longitudinal sectional rear view showing the grass collector and the vehicle-side connector.

As shown in FIGS. 4 and 6, the connecting frame 8 is provided with a pair of connectors 8a formed by bending a single round metal pipe. Each of the pair of connectors 8a is bent in a middle location in the vertical direction as viewed from the side (FIG. 5). Normally, the connectors 7a of the support frame 7 are inserted into the connectors 8a of the connecting frame 8, the connectors 7a, 8a of the support frame 7 and connecting frame 8 are connected in advance by a connecting pin 13, and the support frame 7 and the connecting frame 8 can be separated by removing the connecting pin 13.

As shown in FIGS. 4 and 6, the lower part of the connecting frame 8 is bent in a V shape as viewed from the front (see FIG. 6), and right and left inclined guided portions 8b that face each other such that the distance between the inclined guided portions 8b decreases toward the lower portion thereof are oriented downward. In the connecting frame 8 (see FIG. 6), the right and left inclined guided portions 8b of the connecting frame 8 are eccentrically positioned away from the grass intake vent 9a of the front cover 9 described hereinafter.

The front cover 9 in the grass collector 6 will next be described.

Figure 10:
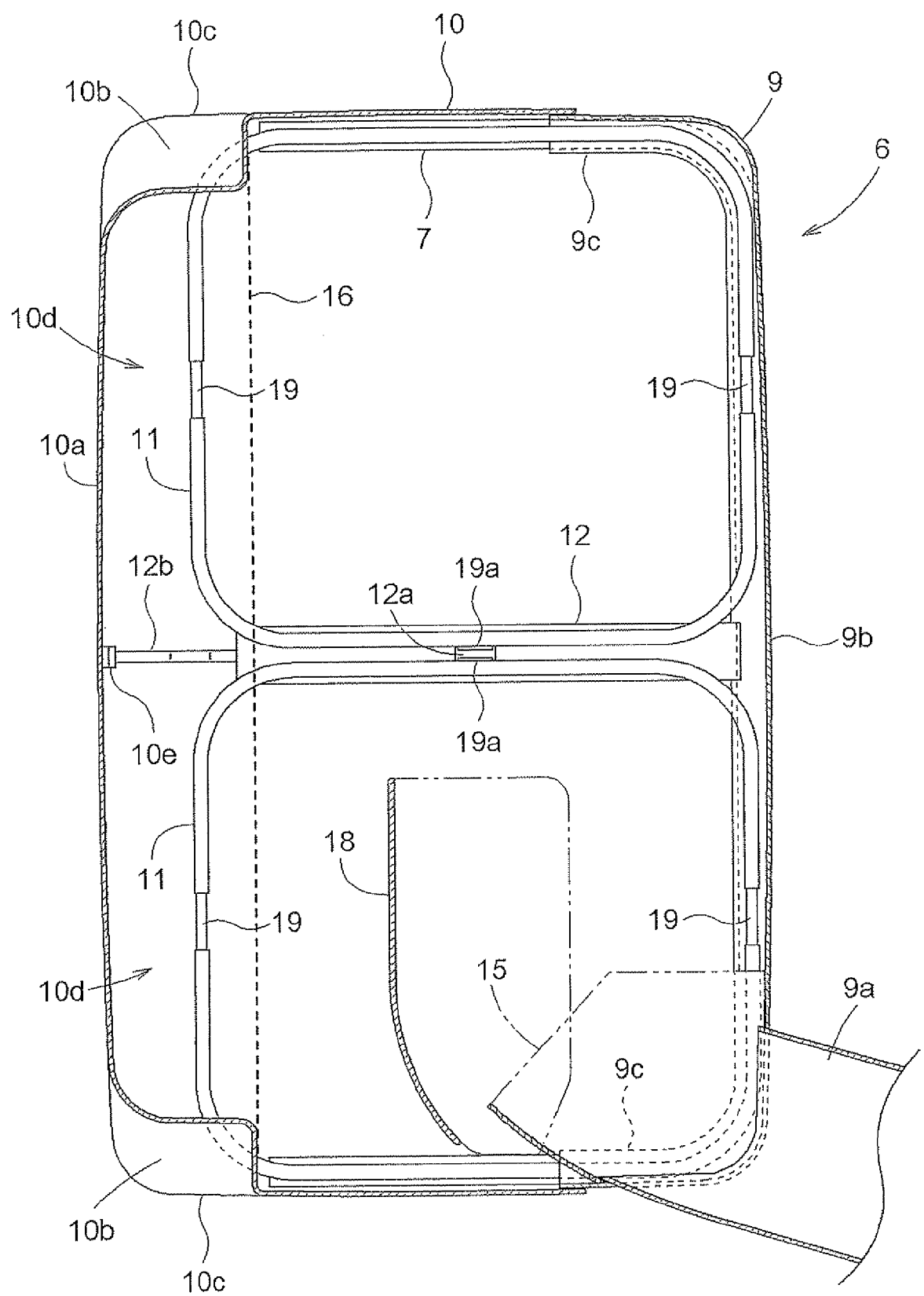
FIG. 10 is a transverse sectional plan view showing the grass collector.

As shown in FIGS. 5, 6, and 10, the front cover 9 is integrally formed by synthetic resin, and the rear side thereof is opened. A small, duct-shaped grass intake vent 9a is provided to the right front part of the front cover 9; a duct 14 (see FIGS. 1 and 2) is connected across the cut-grass discharge vent (not shown) of the mower 4, and the grass intake vent 9a of the front cover 9; and an eave-shaped guide plate 15 is fixed to the upper side part of the grass intake vent 9a of the front cover 9 in the inside of the front cover 9.

As shown in FIGS. 5, 6, and 10, the front lower end part 9b and the right and left side lower end parts 9c of the front cover 9 form a cross-sectional bracket shape that opens outward to the front and the side, and the support frame 7 is fitted into the front lower end part 9b and the right and left side lower end parts 9c of the front cover 9 and connected by bolts. In this case, notches 9d for preventing interference between the connectors 7a of the support frame 7 and the support frame 12 are provided to the front lower end part 9b of the front cover 9.

The rear cover 10 in the grass collector 6 will next be described.

Figure 3:
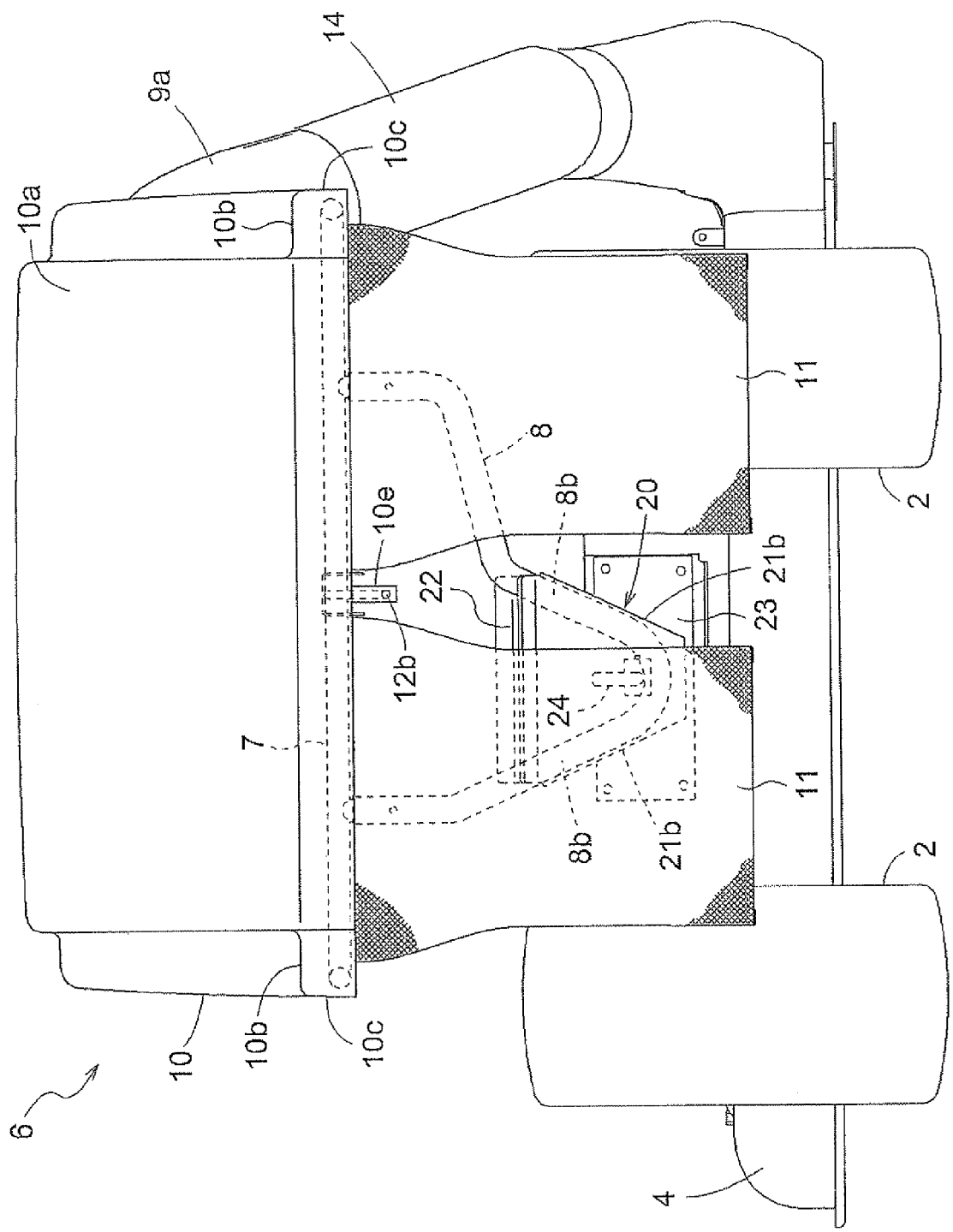
FIG. 3 is a rear view showing the entire riding-type mower vehicle.

As shown in FIGS. 3, 5, and 10, the rear cover 10 is integrally formed by synthetic resin, and the front side thereof is open. The rear portion of the rear cover 10 is provided with an overhanging portion 10a across the substantial entire left-right width, a horizontal portion 10b is provided to the lower portion of the right and left transverse side portions of the rear cover 10, and the lower end portion 10c extends downward from the horizontal portion 10b.

As shown in FIGS. 5 and 10, in the inside of the rear cover 10, a mesh ventilation sheet 16 extends over the entire left-right width of the overhanging portion 10a of the rear cover 10, and is fixed at a slight distance from the overhanging portion 10a of the rear cover 10; and an exhaust vent 10d is formed between the lower end of the ventilation sheet 16 and the lower end of the overhanging portion 10a of the rear cover 10. A hinge member 17 is fixed to the upper portion of the front portion of the rear cover 10, the rear cover 10 is supported by the front cover 9 so as to be able to swing by the hinge member 17, and the rear cover 10 can be operated to a closed position (see the solid line in FIG. 5) and an open position (see the double-dashed line in FIG. 5) that is swung upward from the closed position.

As shown in FIGS. 3, 5, and 10, a rubber locking part 10e is fixed to the lower end portion of the overhanging portion 10a of the rear cover 10. The locking part 10e of the rear cover 10 is engaged with the locking part 12b of the support frame 12 in the closed position of the rear cover 10, whereby the rear cover 10 can be fixed in the closed position.

As shown in FIG. 10, a guide plate 18 is fixed inside the rear cover 10 in the left-right direction. In the closed position of the rear cover 10, the guide plate 18 connects with the guide plate 15 and the grass intake vent 9a of the front cover 9, and when the rear cover 10 is placed in the open position, the guide plate 18 moves upward together with the rear cover 10 and separates from the guide plate 15 and the grass intake vent 9a of the front cover 9.

The grass collecting bags 11 in the grass collector 6 will next be described.

As shown in FIG. 4, casing frames 19 are formed by bending a round metal rod into a square shape as viewed from above (see FIG. 10), and air-permeable cloth grass collecting bags 11 are wrapped onto and attached to the casing frames 19. In this case, the grass collecting bags 11 are provided with notches 11a in a plurality of locations and are configured such that portions of the casing frames 19 are exposed. The operator can manually hold the exposed portions of the casing frames 19. In the portion of a single notch 11a of the grass collecting bags 11, a downward-facing protrusion 19a is fixed to the casing frame 19.

As shown in FIGS. 5, 6, and 10, when the grass collecting bags 11 are attached to the support frames 7, 12, the casing frames 19 are placed at the front lower end part 9b of the front cover 9, the right and left side lower end parts 9c, and the support frames 7, 12; the protrusions 19a of the casing frames 19 are inserted into openings 12a of the support frame 12; and the rear cover 10 is placed in the closed position and fixed. The positions of the grass collecting bags 11 are determined by the engaging of the protrusions 19a of the casing frames 19 with the openings 12a of the support frame 12, and the grass collecting bags 11 are fixed by the pushing of the horizontal portion 11b of the rear cover 10 against portions of the casing frames 19 from above.

In the state shown in FIGS. 5, 6, and 10, the cut grass cut by the mower 4 is carried by the air current of the mower 4 into the grass intake vent 9a of the front cover 9 from the duct 14, and the cut grass is primarily fed from the grass intake vent 9a of the front cover 9 to the grass collecting bag 11 farthest from the grass intake vent 9a by the guiding action of the guide plates 15, 18, and is then fed to the grass collecting bag 11 closest to the grass intake vent 9a of the front cover 9. During this operation, the air current of the mower 4 passes through the ventilation sheet 16, passes between the ventilation sheet 16 and the overhanging portion 10a of the rear cover 10, and exits downward from the exhaust vent 10d of the rear cover 10.

The structure for connecting the grass collector 6 to the vehicle body frame 3 will next be described.

As shown in FIGS. 1 and 3, the vehicle-side connector 20 is provided to the rear portion of the vehicle body frame 3 so as to face upward and tilt to the rear. As shown in FIGS. 6, 7, 8, and 9, the vehicle-side connector 20 is composed of a first connector 21, a second connector 22, a base plate 23, a prevention member 24 (which corresponds to the prevention mechanism), and other components, and the base plate 23 is bolted to the rear portion of the vehicle body frame 3.

As shown in FIGS. 6, 7, 8, and 9, the first connector 21 is formed by bending a metal plate, and is composed of a receiving portion 21a in an inverted triangle shape as viewed from the front (see FIGS. 6 and 9), right and left inclined guide portions 21b, an upper inclined guide portion 21c, and other components, and the end portions of the right and left inclined guide portions 21b of the first connector 21 are connected to the base plate 23. In this case, the right and left inclined guide portions 21b of the first connector 21 are configured so as to face each other in a V shape as viewed from the front (see FIGS. 6 and 9) such that the distance between the right and left inclined guide portions 21b decreases towards the lower portions thereof.

As shown in FIGS. 6, 7, 8, and 9, the second connector 22 is formed by bending a metal plate, and is composed of a receiving portion 22a in an inverted triangle shape as viewed from the front (see FIGS. 6 and 9), an upper inclined guide portion 22b, and other components. The end portions of the receiving portion 22a of the second connector 22 are connected to the right and left inclined guide portions 21b of the first connector 21 such that the receiving portions 21a, 22a of the first and second connectors 21, 22 are at the same distance (parallel) along the entire length thereof as viewed from the side (see FIG. 7).

Figure 7:
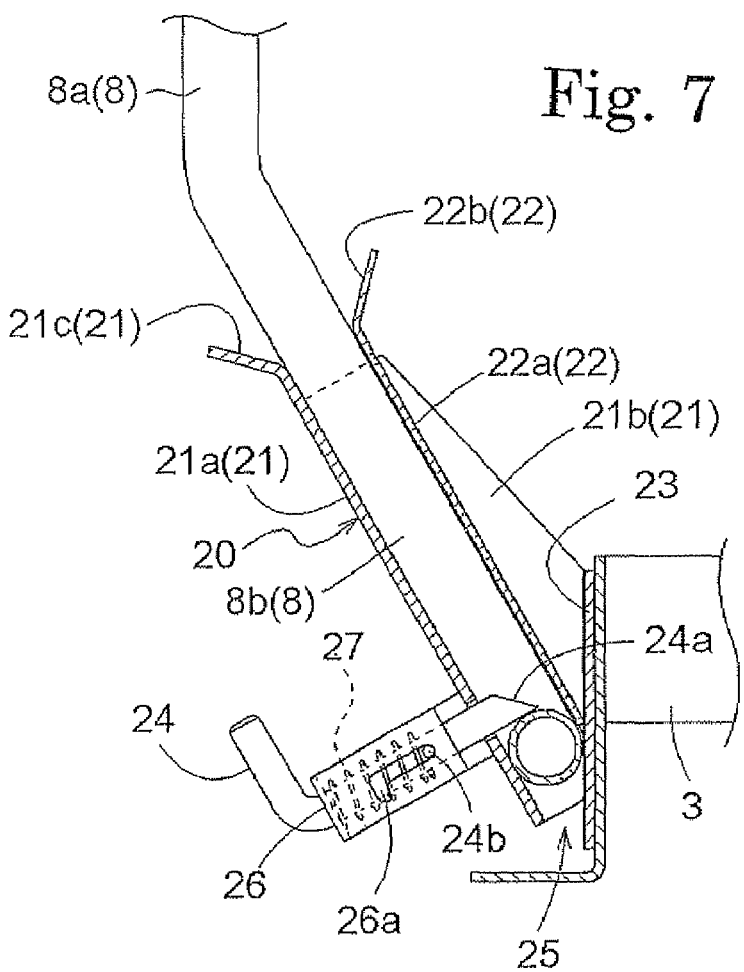
FIG. 7 is a longitudinal sectional side view showing the vehicle-side connector.
Figure 8:
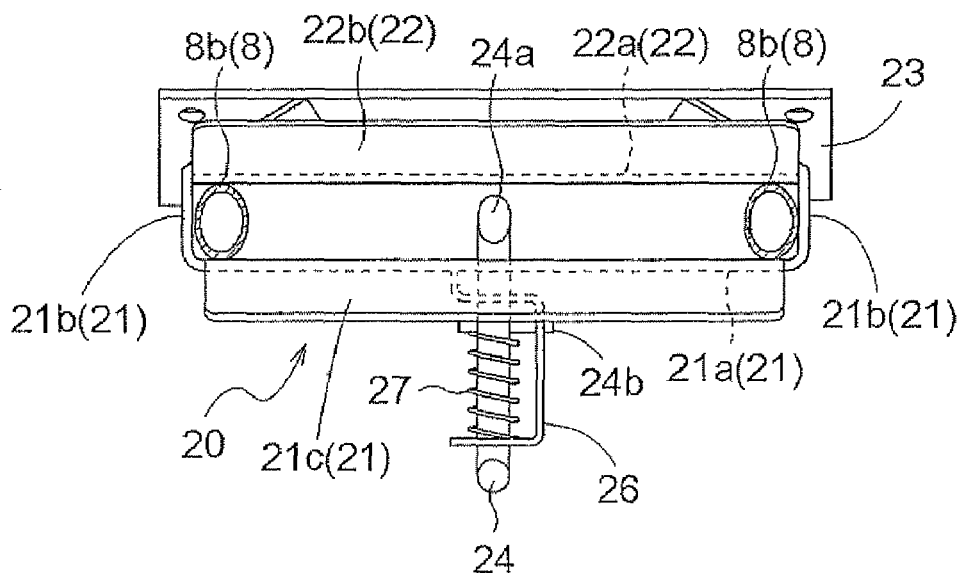
FIG. 8 is a plan view showing the vehicle-side connector.
Figure 9:
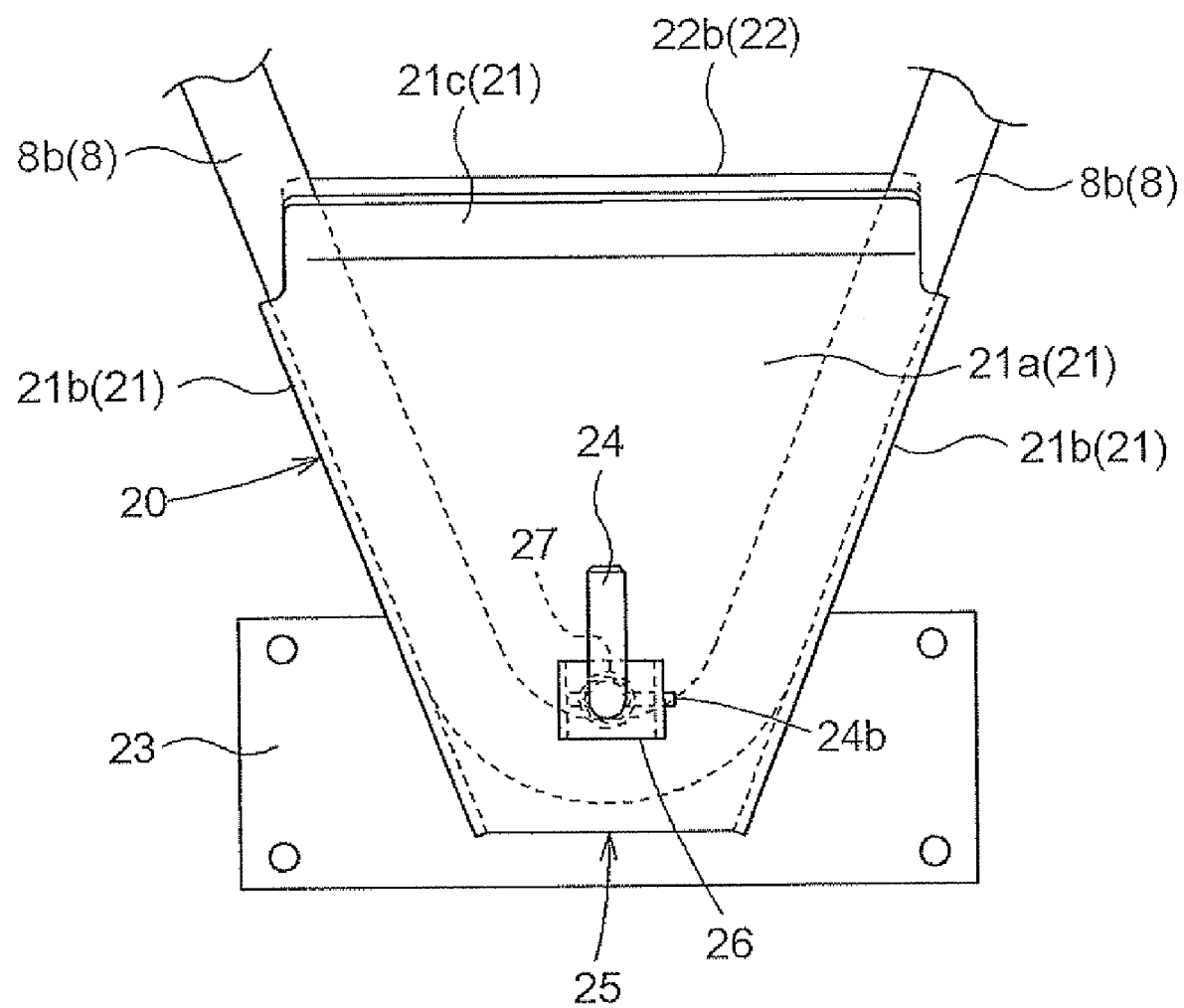
FIG. 9 is a rear view showing the vehicle-side connector.

In this case, the gap between the receiving portions 21a, 22a of the first and second connectors 21, 22 is set so as to be substantially the same as the outer diameter of the right and left inclined guided portions 8b of the connecting frame 8, as shown in FIGS. 7 and 8. As shown in FIGS. 6, 7, and 9, an open portion 25 is formed between the lower end portion of the base plate 23 and the lower end portions of the first and second connectors 21, 22, and cut grass, debris, or the like that enters between the receiving portions 21a, 22a of the first and second connectors 21, 22 exits downward from the open portion 25.

As shown in FIGS. 7, 8, and 9, a support bracket 26 is formed by folding a metal plate, the support bracket 26 is connected to the receiving portion 21a of the first connector 21, the pin-shaped prevention member 24 is supported by the support bracket 26 so as to be able to slide to the left and right in the drawing, and the prevention member 24 is inserted between the receiving portions 21a, 22a of the first and second connectors 21, 22 from the open portion of the receiving portion 21a of the first connector 21. The distal end portion 24a of the prevention member 24 is formed by an inclined surface as viewed from the side (see FIG. 7), a spring 27 is provided between the support bracket 26 and a pin 24b fixed to the prevention member 24, and the prevention member 24 is urged in between the receiving portions 21a, 22a of the first and second connectors 21, 22 by the spring 27.

As shown in FIGS. 7, 8, and 9, a crank-shaped elongated hole 26a is provided to the support bracket 26, the pin 24b of the prevention member 24 is inserted into the elongated hole 26a of the support bracket 26, the rotation of the prevention member 24 is stopped, and the distal end portion 24a of the prevention member 24 is maintained in the orientation shown in the side view of FIG. 7. The prevention member 24 is withdrawn from between the receiving portions 21a, 22a of the first and second connectors 21, 22; and the pin 24b of the prevention member 24 is engaged in the bent portion of the elongated hole 26a of the support bracket 26, whereby the prevention member 24 can be retained in the position of withdrawal from between the receiving portions 21a, 22a of the first and second connectors 21, 22.

Attachment of the grass collector 6 (connecting frame 8) to the vehicle body frame 3 (vehicle-side connector 20) will next be described.

As shown in FIGS. 6, 7, and 8, the right and left inclined guided portions 8b of the connecting frame 8 (grass collector 6) are inserted from above from between the inclined guide portions 21c, 22b above the first and second connectors 21, 22 (vehicle-side connector 20) to between the receiving portions 21a, 22a of the first and second connectors 21, 22 (vehicle-side connector 20) while the grass collector 6 (connecting frame 8) is moved downward.

In this case, as shown in FIGS. 6 and 9, the right and left inclined guide portions 21b of the first connector 21 (vehicle-side connector 20) face each other so that the distance between the right and left inclined guide portions 21b decreases towards the lower portions thereof. Therefore, the right and left inclined guided portions 8b of the connecting frame 8 (grass collector 6) can easily be inserted between the right and left inclined guide portions 21b of the first connector 21 (vehicle-side connector 20) from above. The guiding function of the right and left inclined guide portions 21b of the first connector 21 (vehicle-side connector 20) allows the right and left inclined guided portions 8b of the connecting frame 8 (grass collector 6) to be guided towards the inside (downward) between the right and left inclined guide portions 21b of the first connector 21 (vehicle-side connector 20).

As shown in FIGS. 6, 7, and 9, when the lower end portions of the right and left inclined guided portions 8b of the connecting frame 8 (grass collector 6) reach the distal end portion 24a of the prevention member 24, the prevention member 24 is pushed to the left in FIG. 7 against the prevention member 24 by the lower end portions of the right and left inclined guided portions 8b of the connecting frame 8 (grass collector 6), the prevention member 24 is again moved to the right in FIG. 7 by the spring 27, and the distal end portion 24a of the prevention member 24 enters above the lower end portions of the right and left inclined guided portions 8b of the connecting frame 8 (grass collector 6).

In this state, as shown in FIGS. 6, 7, 8, and 9, the right and left inclined guided portions 8b of the connecting frame 8 (grass collector 6) are in contact with the receiving portions 21a, 22a of the first and second connectors 21, 22 (vehicle-side connector 20) as viewed from the side (see FIG. 7), and in contact with the right and left inclined guide portions 21b of the first connector 21 (vehicle-side connector 20) as viewed from the front (see FIGS. 6 and 9). The distal end portion 24a of the prevention member 24 enters above the lower end portions of the right and left inclined guided portions 8b of the connecting frame 8 (grass collector 6), whereby the connecting frame 8 (grass collector 6) does not escape upward from the vehicle-side connector 20, and the grass collector 6 (connecting frame 8) is securely attached to the vehicle body frame 3 (vehicle-side connector 20).

As shown in FIGS. 6, 7, 8, and 9, in the state in which the grass collector 6 (connecting frame 8) is attached to the vehicle body frame 3 (vehicle-side connector 20), the right and left inclined guided portions 8b of the connecting frame 8 (grass collector 6) continue to enter (wedge) inside (downward) between the right and left inclined guide portions 21b of the first connector 21 (vehicle-side connector 20) as a result of the guiding action of the right and left inclined guide portions 21b of the first connector 21 (vehicle-side connector 20), as well as the guiding action of the right and left inclined guided portions 8b of the connecting frame 8 (grass collector 6), due to the weight of the grass collector 6 itself and the weight of the cut grass accumulated in the grass collector 6. Through the aforementioned wedging action, the grass collector 6 (connecting frame 8) is supported by the vehicle body frame 3 (vehicle-side connector 20) with minimal rattling.

When the grass collector 6 (connecting frame 8) is then removed from the vehicle body frame 3 (vehicle-side connector 20), the prevention member 24 is withdrawn from between the receiving portions 21a, 22a of the first and second connectors 21, 22, and the pin 24b of the prevention member 24 is engaged in the bent portion of the elongated hole 26a of the support bracket 26, whereby the prevention member 24 is retained in the position of withdrawal from between the receiving portions 21a, 22a of the first and second connectors 21, 22. The right and left inclined guided portions 8b of the connecting frame 8 (grass collector 6) are then withdrawn upward from between the receiving portions 21a, 22a of the first and second connectors 21, 22 (vehicle-side connector 20) while the grass collector 6 (connecting frame 8) is moved upward, whereby the grass collector 6 (connecting frame 8) can be detached from the vehicle body frame 3 (vehicle-side connector 20).

Figure 11:
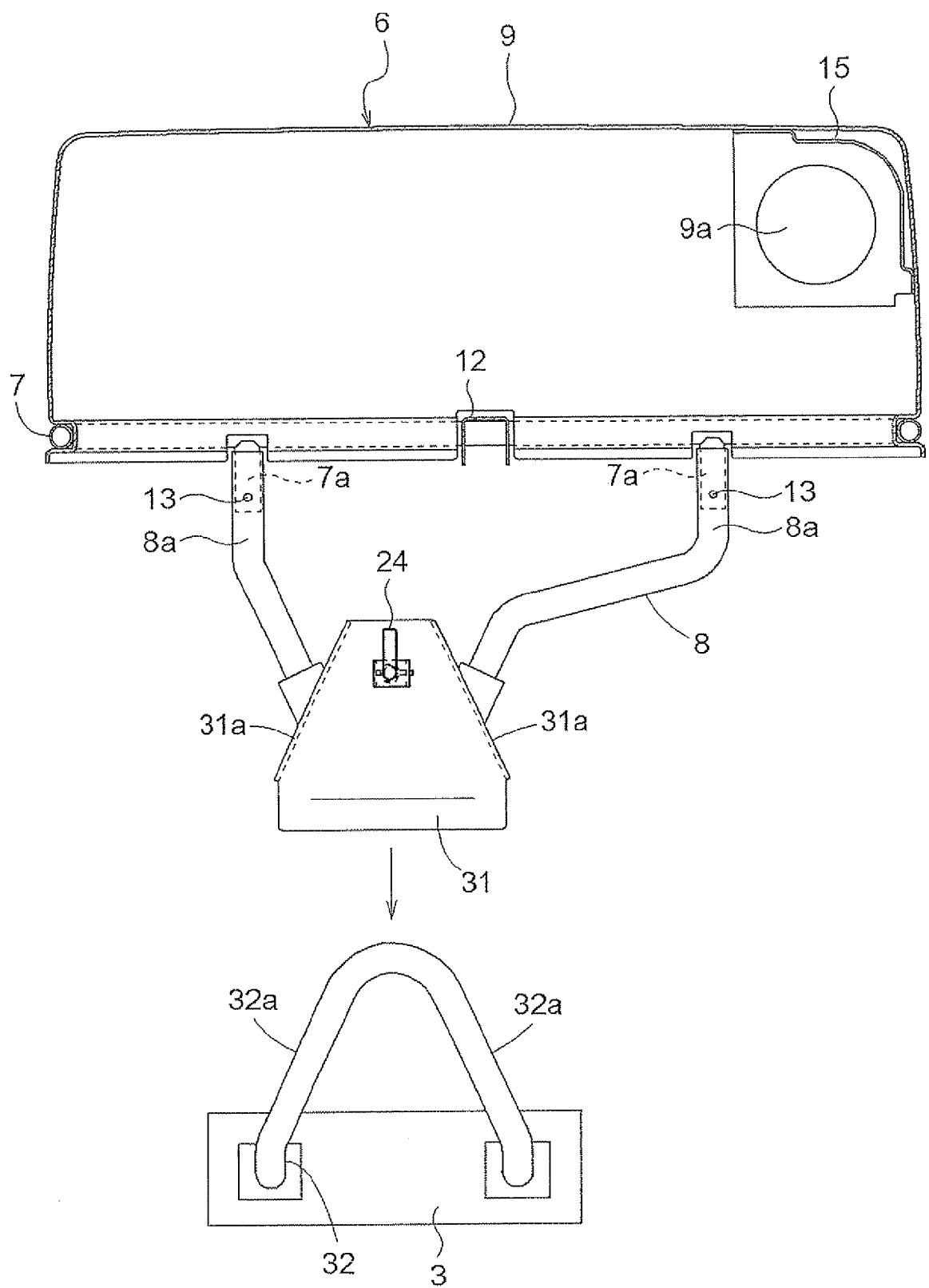
FIG. 11 is a rear view showing the grass collector, the collector-side connector, and the vehicle-side connector in a first other embodiment of the invention.

A configuration such as the one shown in FIG. 11 may be adopted in the embodiment described above.

As shown in FIG. 11, the right and left inclined guided portions 8b are omitted in the connecting frame 8, a collector-side connector 31 (provided with the first connector 21, the second connector 22, the prevention member 24, the support bracket 26, and the spring 27, but not the base plate 23) configured in the same manner as the vehicle-side connector 20 shown in FIGS. 6, 7, 8, and 9 is set vertically backwards, and the collector-side connector 31 is fixed to the connecting frame 8. In this case, the collector-side connector 31 is provided with right and left inclined guided portions 31a that face each other (i.e., open downward) so that the distance between the right and left inclined guided portions 31a decreases towards the upper portions thereof. A vehicle-side connector 32 is formed by folding a single round metal pipe into an inverted V shape, the vehicle-side connector 32 is fixed to the rear portion of the vehicle body frame 3, and right and left inclined guide portions 32a are provided to the vehicle-side connector 32 so that the distance between the right and left inclined guide portions 32a decreases towards the upper portions thereof.

As shown in FIG. 11, when the grass collector 6 (collector-side connector 31) is attached to the vehicle body frame 3 (vehicle-side connector 32), the right and left inclined guide portions 32a of the vehicle-side connector 32 are inserted from below between the right and left inclined guided portions 31a of the collector-side connector 31 while the grass collector 6 (collector-side connector 31) is moved downward.

In this case, as shown in FIG. 11, the right and left inclined guided portions 31a of the collector-side connector 31 face each other so that the distance between the right and left inclined guided portions 31a decreases towards the upper portions thereof. Therefore, the right and left inclined guide portions 32a of the vehicle-side connector 32 can easily be inserted between the right and left inclined guided portions 31a of the collector-side connector 31 from below. The guiding function of the right and left inclined guide portions 32a of the vehicle-side connector 32 allows the right and left inclined guide portions 32a of the vehicle-side connector 32 to be guided towards the inside (upward) between the right and left inclined guided portions 31a of the collector-side connector 31.

As shown in FIG. 11, when the upper end portions of the right and left inclined guide portions 32a of the vehicle-side connector 32 reach the distal end portion 24a of the prevention member 24, the prevention member 24 is pushed against the spring 27 by the upper end portions of the right and left inclined guide portions 32a of the vehicle-side connector 32, the prevention member 24 is again entered by the spring 27, and the distal end portion 24a of the prevention member 24 enters below the upper end portions of the right and left inclined guide portions 32a of the vehicle-side connector 32.

In this state, as shown in FIG. 11, the right and left inclined guided portions 31a of the collector-side connector 31 are in contact with the right and left inclined guide portions 32a of the vehicle-side connector 32, and the distal end portion 24a of the prevention member 24 enters below the upper end portions of the right and left inclined guide portions 32a of the vehicle-side connector 32, whereby the collector-side connector 31 does not escape upward from the vehicle-side connector 32, and the grass collector 6 (collector-side connector 31) is securely attached to the vehicle body frame 3 (vehicle-side connector 32).

Figure 12:
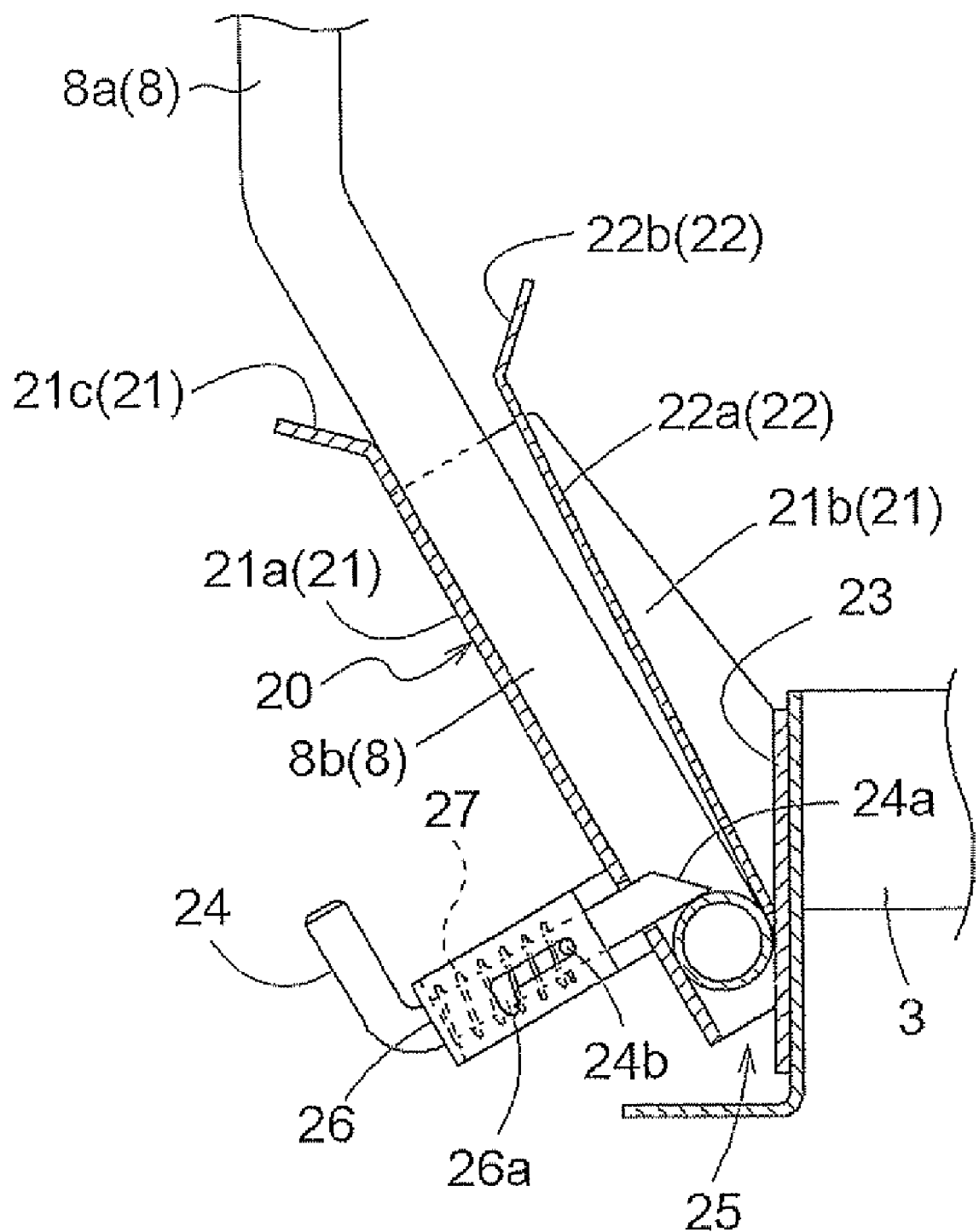
FIG. 12 is a longitudinal sectional side view showing the vehicle-side connector in a second other embodiment of the invention.

A configuration such as the one shown in FIG. 12 may be adopted in the two embodiments described above.

As shown in FIG. 12, when the distal end portion of the receiving portion 22a of the second connector 22 is connected to the right and left inclined guide portions 21b of the first connector 21, a configuration may be adopted in which the receiving portions 21a, 22a of the first and second connectors 21, 22 spread upward as viewed from the side (see FIG. 12). Through this configuration, the right and left inclined guided portions 8b of the connecting frame 8 (grass collector 6) can easily be inserted from above between the receiving portions 21a, 22a of the first and second connectors 21, 22 (vehicle-side connector 20).

Through this configuration, the right and left inclined guided portions 8b of the connecting frame 8 (grass collector 6) are in contact with the receiving portion 21a of the first connector 21 (vehicle-side connector 20), and in contact with the right and left inclined guide portions 21b of the first connector 21 (vehicle-side connector 20) through the weight of the grass collector 6 itself and the weight of the cut grass accumulated in the grass collector 6, and the right and left inclined guided portions 8b of the connecting frame 8 are slightly separated from the receiving portion 22a of the second connector 22.

What is claimed is:

1. A riding-type mower vehicle comprising:
a vehicle body supported by a plurality of wheels;
a mower supported by the vehicle body;
a grass collector attached to a rear part of the vehicle body and configured to receive cut grass cut by the mower, and having a grass intake vent provided in one side end region in a transverse direction of the vehicle body, the grass collector being disposed at opposite sides of a center with reference to the transverse direction of the vehicle body;
a duct extending along one side of the vehicle body for directing the cut grass cut by the mower toward the grass intake vent of the grass collector;
a vehicle-side connector located at a rear position of the vehicle body and having a pair of inclined guide portions that face each other such that a distance between the inclined guide portions decreases toward lower portions of the inclined guide portions to open upwardly; and
a collector-side connector provided to the grass collector to extend generally downwardly and having a pair of inclined guided portions whose distance from each other decreases toward lower portions of the inclined guided portions; wherein
the collector-side connector is attached to the vehicle-side connector by inserting the inclined guided portions of the collector-side connector between the pair of inclined guide portions of the vehicle-side connector, and a connection between the vehicle-side connector and the collector-side connector is eccentrically positioned away from the grass intake vent.

2. The riding-type mower vehicle according to claim 1, further comprising a disengagement prevention member for preventing the collector-side connector from disengaging from the vehicle-side connector.

3. The riding-type mower vehicle according to claim 1, wherein
each of the pair of inclined guide portions has a linear portion having a length that is 50% or greater of a vertical length of the vehicle-side connector.

4. The riding-type mower vehicle according to claim 3, wherein
each of the pair of inclined guide portions has a linear portion having a length that is 80% or greater of a vertical length of the vehicle-side connector.

5. The riding-type mower vehicle according to claim 3, wherein
substantially the entirety of the linear portion comes in contact with a corresponding portion of the pair of inclined guided portions when the collector-side connector is attached to the vehicle-side connector.

6. The riding-type mower vehicle according to claim 1, wherein
the vehicle-side connector supports substantially the entire weight of the collector when the collector-side connector is attached to the vehicle-side connector.

7. The riding-type mower vehicle according to claim 1, wherein
the inclined guide portions include a first inclined guided member and a second inclined guided member, and
wherein the collector-side connector includes a first connecting member having one end connected to the grass collector at a first connecting point and the other end connected to the first inclined guide member, and a second connecting member having one end connected to the grass collector at a second connecting point and the other end connected to the second inclined guide member, the first connecting point and the second connecting point being disposed at opposite sides of a center with reference to the transverse direction of the vehicle body, the second connecting member having an extension extending along the transverse direction of the vehicle body.

8. The riding-type mower vehicle according to claim 7, wherein
the first inclined guide member and the second inclined guide member extend downward obliquely to be close to each other.

9. The riding-type mower vehicle according to claim 7, wherein
the first connecting member, the second connecting member, the first inclined guide member, and the second inclined guide member are formed of one bent metal round pipe.

* * * * *